United States Patent [19]

Pfalzer et al.

[11] 4,243,478
[45] Jan. 6, 1981

[54] PROCESS FOR TREATING WASTE PAPER WITH HARDENED WATER

[75] Inventors: Lothar Pfalzer; Siegbert Fischer, both of Heidenheim, Fed. Rep. of Germany

[73] Assignee: J. M. Voith GmbH, Fed. Rep. of Germany

[21] Appl. No.: 963,321

[22] Filed: Nov. 24, 1978

[30] Foreign Application Priority Data

Nov. 24, 1977 [DE] Fed. Rep. of Germany ....... 2752413

[51] Int. Cl.$^3$ .............................................. D21C 5/02
[52] U.S. Cl. ........................................ 162/4; 162/6; 162/38
[58] Field of Search ....................... 162/4–8, 162/55, 90, 29, 38, 45; 423/430

[56] References Cited

U.S. PATENT DOCUMENTS

| | | | |
|---|---|---|---|
| 2,112,562 | 3/1938 | Fisher | 162/4 |
| 2,631,922 | 3/1953 | Schur et al. | 423/430 |
| 3,208,935 | 9/1965 | Nesbitt | 423/430 |

FOREIGN PATENT DOCUMENTS 699582 of 1964 Canada .
51-20604 of 1976 Japan .......................................... 162/5

OTHER PUBLICATIONS

Comprehensive Treatise in Inorganic Chemistry, Mellor, vol. 3, 1922, pp. 826–829, 843.

*Primary Examiner*—Peter F. Kratz
*Attorney, Agent, or Firm*—Ostrolenk, Faber, Gerb & Soffen

[57] ABSTRACT

Water used in the treatment of waste paper is now commonly re-cycled. Hard water is required for such processes. For maintaining the hardness of the water, the re-cycled water is hardened by dissolving calcium carbonate and carbon dioxide in it, thereby forming calcium bicarbonate. An apparatus for hardening the water comprises a mixing container with inlets for waste water, carbon dioxide, and calcium carbonate, and with outlets for foam, hardened water and undissolved calcium carbonate.

5 Claims, 5 Drawing Figures

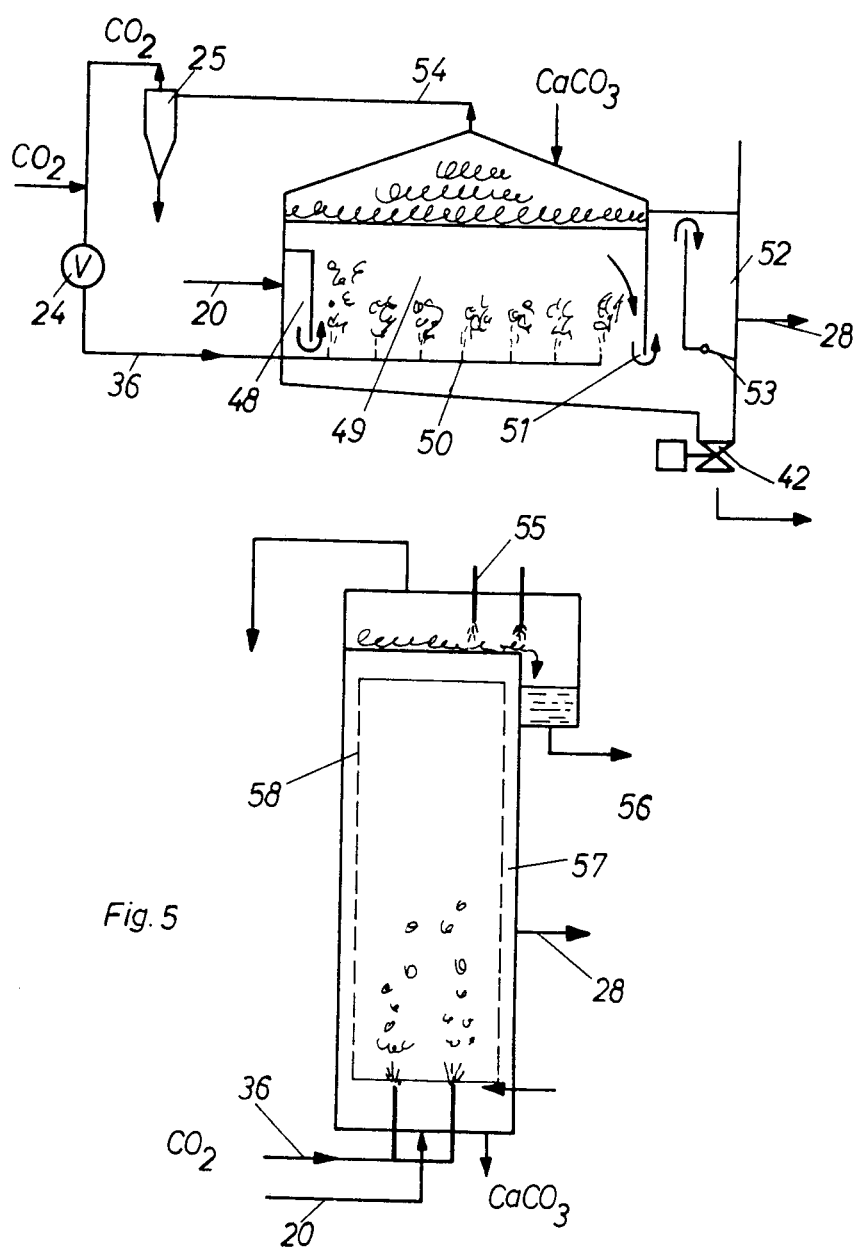

PROCESS FOR TREATING WASTE PAPER WITH HARDENED WATER

The invention relates to a process and to a device for hardening water particularly during the treatment of waste paper.

BACKGROUND OF THE INVENTION

In the treatment of waste paper, it is increasingly the practice to recycle the requisite water in order to keep water consumption as low as possible and to avoid environmental pollution.

However, particularly in flotation plants, a closed water cycle suffers the problem that soap, fatty acid or other chemicals cause a gradual reduction in the water hardness. The soap or other chemicals used during the flotation process must be converted into insoluble calcium soap by water hardening agents contained in normal water. If the water is not hard enough and there is too little calcium soap in the water, less printing ink is removed from the paper. The resulting paper is then dark and this makes it difficult to use the resulting waste paper in a paper machine. In particular, the fatty acid released from the soluble sodium soap during acidification can cause stickiness.

Previously, the problem was overcome by introducing calcium chloride into the closed water cycle. Calcium chloride can be easily dissolved in water and it forms calcium ions, which increases the water hardness appropriately. However, the calcium chloride in the water also produces chlorine ions, which then reacts with the sodium ions of the soap producing considerable quantities of sodium chloride. Slightly more sodium chloride is formed than the amount of calcium chloride that is introduced. This means that, for example, in a waste paper treatment plant which treats 100 tons of waste paper per day, approximately 300 kg sodium chloride could be formed daily. This quantity of sodium chloride often leads to extremely unpleasant corrosion phenomena throughout the entire plant.

SUMMARY OF THE INVENTION

It is an object of the invention to provide a process for treating waste paper.

It is another object of the invention to provide a process for hardening water.

It is a further object of the invention to perform the foregoing processes without also causing corrosion phenomena.

Yet another object of the invention is to produce apparatus for realizing the foregoing objects.

The present invention provides a process for the treatment of waste paper, wherein the major part of the water required during the treatment i.e. during the dissolving, cleaning, washing, etc. is recycled, after suitable clarification and purification the process includes the step of at least maintaining and usually increasing the hardness of the water that is being recycled by dissolving calcium carbonate and carbon dioxide in the water thereby forming calcium bicarbonate. Another advantage of this process is that the method results in an increase in the bleaching action, upon peroxide bleaching. The present invention also relates to the process of hardening the water.

Calcium carbonate ($CaCO_3$) itself dissolves poorly in water. However, in water which contains carbonic acid, calcium bicarbonate ($Ca(HCO_3)_2$) is formed. It has been established, for example, that only approximately 14 mg of $CaCO_3$ is soluble in one liter of pure water at 20° C., whereas in the presence of carbon dioxide, 1086 mg is soluble. This finding is now employed in accordance with the invention for the hardening of the water required in waste paper treatment.

The present invention also provides a water hardening apparatus for use in performing the above described processes, comprising a mixing container having a waste water inlet line, an injection pipeline for carbon dioxide, an inlet pipeline for calcium carbonate, a foam outlet, an outlet line for the hardened water and a discharge in the lower region thereof for undissolved calcium carbonate.

In one preferred embodiment of the invention, the mixing container includes an inlet chamber which contains an agitator, and the air-injection pipeline for the carbon dioxide opens into the inlet chamber. The mixer also includes a settling chamber which contains the outlet line for the hardened water.

In another embodiment, the mixing container is cylindrical or rectangular in shape and is designed in accordance with the counterflow principle. This results in extremely intensive mixing.

Another embodiment has the advantage that it does not require moving parts. The mixing container has an inlet chamber which is adjoined and followed immediately by a gasification chamber containing a plurality of nozzles for the injection of carbon dioxide into the waste water. The plurality of inflows of carbon dioxide so agitates the water that no moving parts are required in the mixing container.

In a further embodiment of the invention, the mixing container is in the form of a column-like, upright container. The air-injection pipeline for carbon dioxide and the inlet line for calcium carbonate open into the central area of the base of the container. The hardened water is discharged from an annular chamber around the mixing container via an outlet line.

It is advantageous for the mixing container to be gas-tight and for the outlets therefrom for foam and hardened water to each be designed like a siphon. As a result of these measures, the excess carbon dioxide can be recycled, which is cost-saving.

BRIEF DESCRIPTION OF THE DRAWINGS

Other objects and features of the invention are now described with reference to embodiments of the invention shown in the accompanying drawings, in which:

FIG. 4 illustrates a further type of mixing container which is in the form of a centrifugal chamber; and FIG. 5 illustrates a mixing container which is in the form of a bubble column.

DESCRIPTION OF THE PREFERRED EMBODIMENTS

Figure 1:
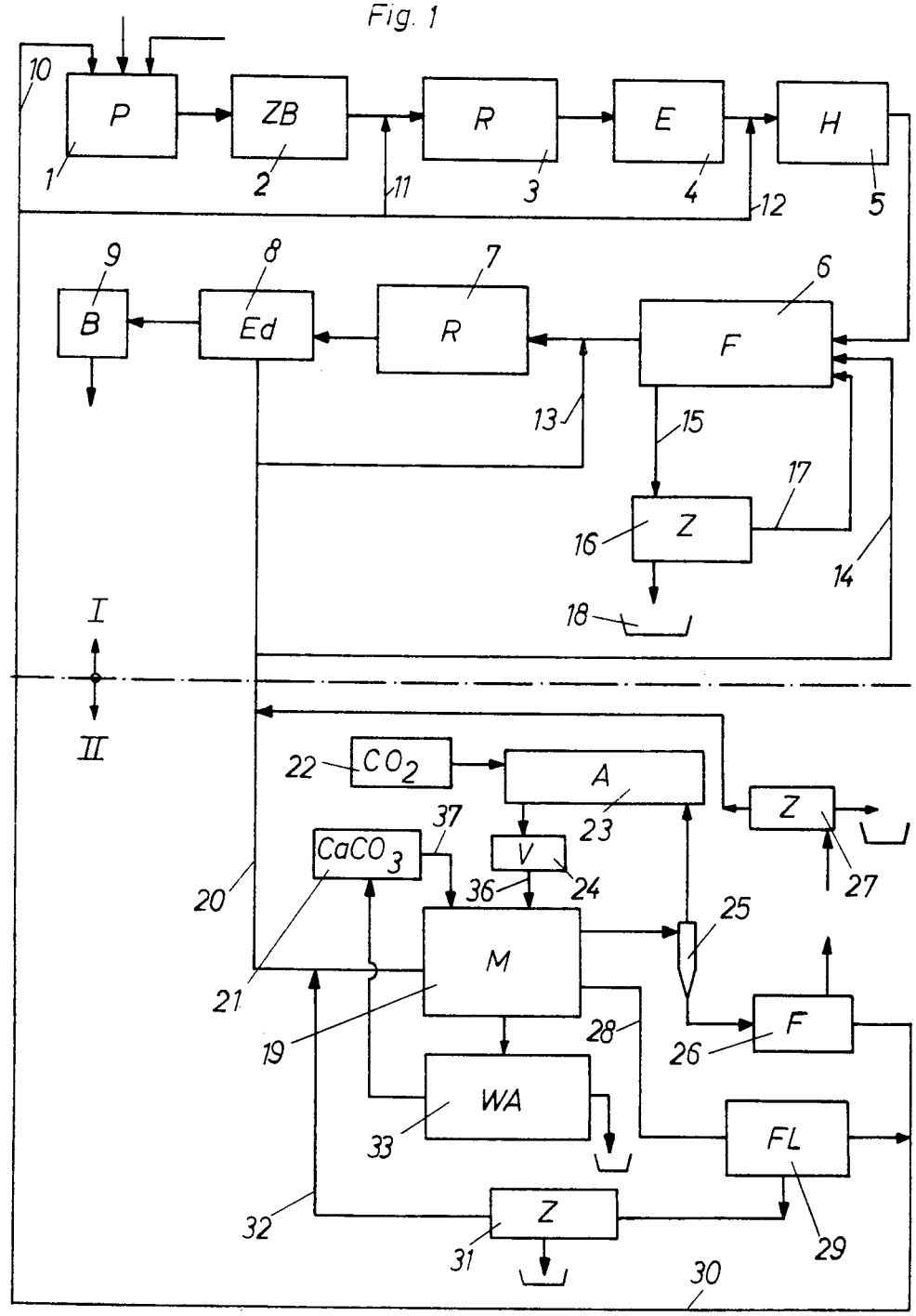
FIG. 1 is a flow diagram illustrating a process for waste paper treatment and for waste water treatment.

FIG. 1 shows a flow diagram of a process for setting up a desired degree of water hardness in, for example, a flotation material treatment plant. The material flow is shown in the upper half of FIG. 1, which is designated I, and the water cycle is represented in the lower half of FIG. 1, which is designated II. This fundamentally deals only with the water flow which is to be returned to the material dissolver. Clarification, cleaning and hardening of the dilution water prior to flotation and cleansing of the diluted material, which can be carried out in the same way, has not been illustrated.

Chemicals, hardened recycled water and fresh water are introduced into a material dissolving device 1. Via an intermediate vat 2, the paper which is to be dissolved passes a thick material cleansing unit 3, a de-specking unit 4 and a sand-removing unit 5 and into a flotation plant 6. Then a thin material cleansing is carried out at 7 and a thickening at 8. Then the material suspension is introduced into a vat 9 for conventional further treatment.

The points at which recycled water must be supplied are indicated by the pipelines 10, 11, 12, 13 and 14. The foam which arises in the flotation plant 6 is fed via a pipeline 15 to a centrifuge 16. In this centrifuge, water which is to be recycled is obtained and this water is fed via a pipeline 17 back to the flotation plant 6. Thickened sediment from centrifuge 16 is collected in a container 18.

The hardening of the water is carried out in a mixing container 19, which is supplied with the water to be hardened via a pipeline 20. In the container 19, the water reacts with calcium carbonate and carbon dioxide. The calcium carbonate passes from a silo 21 via a pipe 37 into the mixing container 19. The carbon dioxide passes from a tank 22 via a treatment device 23 and a blower 24 through the pipeline 36 to the mixing container 19. The foam which forms in the mixing container 19 is fed to a cyclone 25 in which the carbon dioxide is degasified out of the liquid and returned to the treatment device 23. In particular, the closure of the carbon dioxide cycle is of economic significance.

The liquid phase passes into a flotation apparatus 26 for the separation of dirt and suspended particles. The dirt concentrated in the foam is expelled as sludge via a further centrifuge 27, whereas the centrifuge filtrate is returned to the mixing container 19 via the supply line 20. The water which has been cleansed in the flotation apparatus 26 can be re-used for the material treatment. Moreover, the hardened but still cloudy water is expelled from the mixing container 19 via the pipeline 28. This water is cleansed in a flocculation apparatus 29 and then returned to the material treatment stage via a return line recycling the water. The sludge from the flocculation apparatus 29 is expelled, similarly to the foam in the flotation apparatus 26, via a centrifuge 31 from which the clear water is returned to the supply line 20 via a line 32.

The calcium carbonate sludge which is formed in the mixing container 19 is treated in a retreatment device 33 and is returned to the silo 21, also recycling the calcium carbonate, which provides economic benefit.

Figures 2, 3:
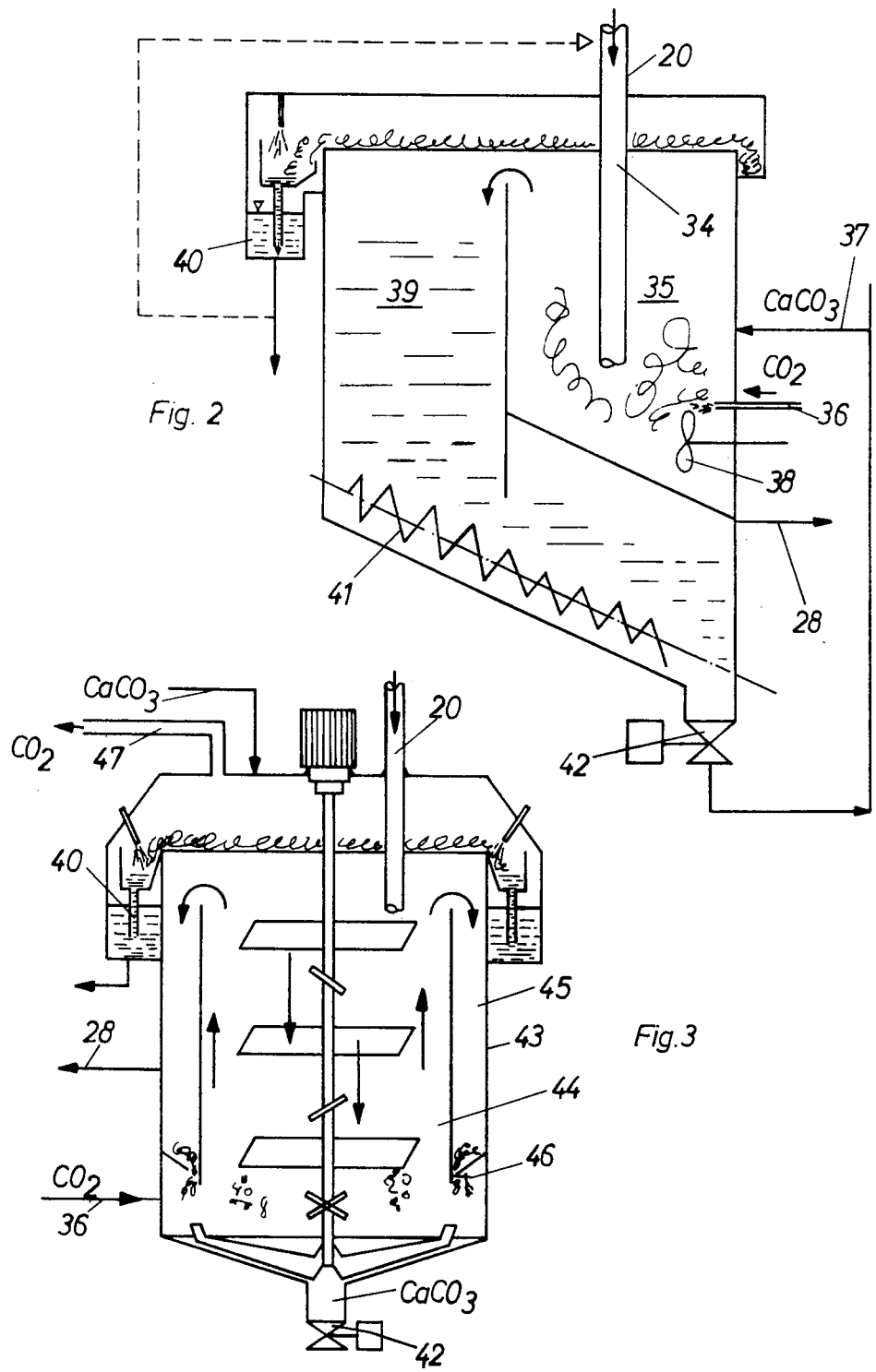
FIG. 2 illustrates one embodiment of a mixing container for use with the invention.
FIG. 3 illustrates another embodiment of a mixing container.

An embodiment of mixing container 19 is shown in more detail in FIG. 2. The water which is to be hardened passes from the supply line 20 via an immersion pipe 34 into an agitating chamber 35 in which it is extremely intensively mixed with carbon dioxide from the pipeline 36 and with calcium carbonate from the pipeline 37. A propeller or agitator 38 serves as mixer. From the agitating chamber 35, the water passes into a settling chamber 39 in which the excess calcium carbonate is able to settle as a sediment. The hardened water is withdrawn via the pipeline 28. The foam which forms during agitation is withdrawn by suction via a liquid sluice 40 (or via the cyclone 25) together with carbon dioxide gas and is then either refloated or directly introduced into a centrifuge. Return into the waste water supply line 29 is also possible, as indicated by the broken line. The sedimented calcium carbonate is expelled via a worm conveyor 41 and a dirt sluice 42. If it is only slightly polluted, the calcium carbonate can be directly refed into the pipeline 37. Otherwise a treatment stage (33 in FIG. 1) is interposed.

FIG. 3 illustrates a second embodiment of mixing container, which is similar in function to the mixing container described in conjunction with FIG. 2, but which is simpler in design. The waste water which is to be hardened is fed via the supply line 20 into a cylindrical container 43 in which it is intensively mixed with calcium carbonate and carbon dioxide by means of agitators 44. The container base is again provided with a heavy dirt outlet sluice 42. The hardened water passes into an annular settling chamber 45 from where it is discharged again via the pipeline 28. Sedimented calcium carbonate is discharged from this annular chamber through slots 46. Excess carbon dioxide is discharged via the pipeline 47. As carbon dioxide is fed into the base of the cylindrical container 45 via the pipeline 36, the hardening of the water takes place in accordance with the counterflow princple.

FIG. 4 illustrates a further form of mixing container which contains no moving parts and consequently is economical in its consumption of energy. The waste water which is to be hardened again passes via supply line 20 into an in-flow chamber 48, and it then enters an adjacent gasification chamber 49 where carbon dioxide is injected by means of nozzles 50. As a result of turbulence in the chamber 49 caused by the nozzles 50, an intimate mixing of $CaCO_3$ and $CO_2$ with the waste water is achieved. Sedimented $CaCO_3$ passes to the heavy dirt sluice 42 either by virtue of gravity or possibly through a scraper apparatus (not shown). The overflow 51 is of siphon-like design since a pressure deviating from atmospheric pressure can prevail inside the container. Moreover, the $CO_2$ can then be conducted in a closed cycle. The hardened water is discharged from a settling chamber 52. A valve 53 allows the sedimented $CaCO_3$ to be discharged from this chamber. The foam leaves the mixing container through a pipeline 54 and is fed to the cyclone 25 in which it is degasified.

FIG. 5 illustrates a fourth, simplified embodiment of the mixing container. This fundamentally represents a bubble column. Here, the $CO_2$ can likewise be returned via a cyclone or the foam is broken down with spray tubes 55 and the overflow is discharged into the pipeline 56. The hardened water is discharged from an annular chamber 57 via the pipeline 28. The annular chamber 57 is formed by a perforated cylindrical ring 58. The $CO_2$ is injected from beneath via the pipeline 36 to assure the turbulence.

The process described thus provides satisfactory means for hardening the water, the corrosion problems associated with the use of calcium chloride being reduced. It is also found that the effectiveness of peroxide bleaching operations may be enhanced.

Although the present invention has been described in connection with several preferred embodiments thereof, many variations and modifications will now become apparent to those skilled in the art. It is preferred, therefore, that the present invention be limited not by the specific disclosure herein, but only by the appended claims.

What is claimed is:

1. A process for the treatment of waste paper, comprising the steps of:

mixing hardened water and other chemicals with paper to be dissolved;

treating the paper with the mixture of water and chemicals and then removing the treating water for recycling;

hardening the removed water by dissolving in the water calcium carbonate and carbon dioxide, thereby forming calcium bicarbonate;

mixing the hardened water again with other chemicals and paper to be dissolved, whereby recycled water is used in the mixing.

2. A process for the treatment of waste paper as claimed in claim 1 wherein the carbon dioxide is injected into the water.

3. A process as claimed in claim 2, further comprising agitating the water as the carbon dioxide is being injected and as the calcium carbonate is being added.

4. A process as claimed in claim 3 further comprising removing foam that is formed during said agitation step, and degasifying the carbon dioxide out of the foam for reinsertion of this carbon dioxide in the water; and reinserting the degasified carbon dioxide in the water.

5. A process as claimed in either of claims 3 or 4, wherein calcium carbonate not dissolved forms a sludge; collecting the sludge and returning it to the water.

* * * * *